G. W. PRIEST.
CEMENT LINED PIPE AND FITTING.
APPLICATION FILED JAN. 6, 1911.
1,005,466.  Patented Oct. 10, 1911.
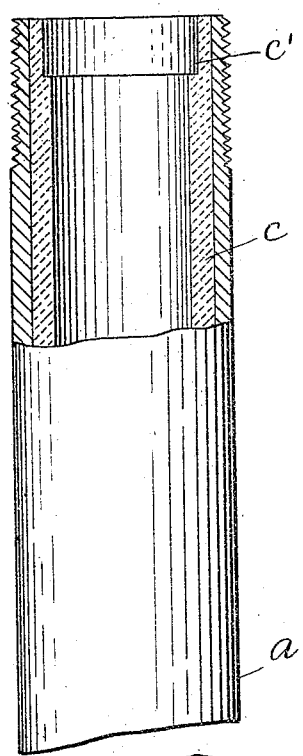
Fig. 1.
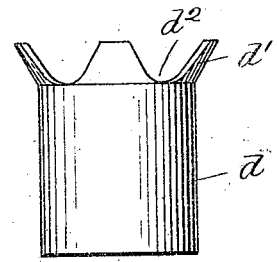
Fig. 2.
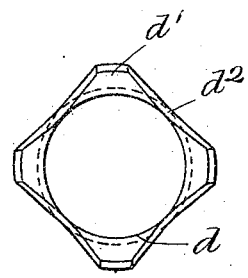
Fig. 3.
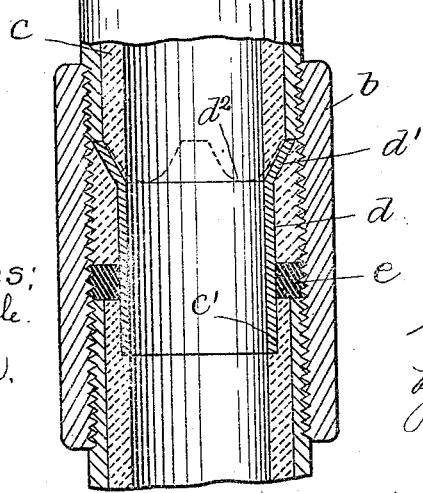
Witnesses:
Cynthia Doyle.
H. B. Davis.
Inventor:
George W. Priest,
by Noyes & Harriman
Attys.

UNITED STATES PATENT OFFICE.

GEORGE W. PRIEST, OF NEWTON, MASSACHUSETTS.

CEMENT-LINED PIPE AND FITTING.

1,005,466.

Specification of Letters Patent.

Patented Oct. 10, 1911.

Application filed January 6, 1911. Serial No. 601,058.

*To all whom it may concern:*

Be it known that I, GEORGE W. PRIEST, residing at Newton, in the county of Middlesex and State of Massachusetts, have invented an Improvement in Cement-Lined Pipes and Fittings, of which the following is a specification.

This invention relates to an improved cement-lined pipe and fitting, and has for its object to provide a cement-lined pipe and fitting connected with said pipe, with improved means for closing the joint at the end of the cement-lined pipe and an adjacent pipe, within the fitting, to protect the fitting from the action of the contents of the pipe.

Figure 1 is a longitudinal vertical section of a cement-lined pipe and fitting embodying this invention, having the end portion of an adjacent pipe connected therewith. Fig. 2 is a side elevation, and Fig. 3 is a plan view of a metal sleeve which is employed for closing the joint at the end of two cement-lined pipes within a fitting.

The metal pipe section $a$ and metal fitting $b$, connected to the end thereof, are or may be of any usual or suitable construction. The fitting here shown for the purpose of illustrating my invention is represented as a coupling, but my invention includes all forms of fittings ordinarily used in connection with pipes. The fitting $b$ is connected to the end of the pipe section $a$, before the cement lining is applied. Said lining is represented at $c$ and extends continuously throughout the length of the pipe section and into the fitting, terminating about midway the length of the fitting.

A metal sleeve is located in the fitting, which is made of brass or other non-oxidizable metal not readily acted upon by the contents of the pipe. Said sleeve is made quite short and comprises a tubular body $d$ having an outwardly extended tapering flange $d'$ at one end, said flange having apertures $d^2$ at its edge, or elsewhere, of any suitable size and shape. The internal diameter of the tubular body $d$ corresponds to the diameter of the bore of the cement-lined pipe, so that said body may serve as and form a part of said bore; and the flange $d'$ is made large enough to engage or abut against the end of the metal pipe section. The cement lining is applied while the metal sleeve, thus constructed, is held in place with its flange abutting against the end of the pipe section, and consequently the cement passes through the apertures $d^2$ and around the tubular body $d$, and the flange becomes anchored in the cement and the whole sleeve becomes embedded therein.

The metal sleeve extends beyond the end of the cement lining in the fitting, to form an annular recess between it and the fitting to receive the opposite end of an adjacent pipe section. The cement lining $c$ extends to the opposite end of the pipe section, but at said opposite end it is formed with an annular recess $c'$, of a depth corresponding to the thickness of the metal of the sleeve. This end of the pipe will be connected to the fitting of an adjacent pipe section, and will be projected into the recess between the sleeve and fitting, and the shoulder at the bottom of the recess $c'$ will abut against the end of the sleeve while the end of the pipe and its cement lining will abut against the end of the cement lining in the fitting, or against a packing $e$, which may be placed in the annular recess at the bottom thereof.

The packing $e$ is preferably employed as the joint is much better protected. By forming the metal sleeve with a flange which abuts against the end of the pipe section it will be seen that when the end of an adjacent pipe is screwed into the fitting and the end of the sleeve is engaged, endwise pressure upon said sleeve will not tend to dislocate it and thereby crack or hip the cement lining contained in the fitting.

Herein it will be observed that the sleeve is not completely separated from the metal pipe section, but the advantages of constructing the sleeve so as to obviate cracking or chipping the lining by an end-thrust I believe more than overcomes the disadvantages of not having it completely separated from the metal pipe section.

By forming the apertures $d^2$ at the edge of the flange $d$, as here shown, it will be observed that engagement of the sleeve with the metal pipe section is not continuous.

I claim:—

1. A metal pipe section and fitting connected together having a continuous cement lining extending throughout the length of the pipe section and into the fitting, and a metal sleeve arranged in said fitting having an outwardly extended flange at one end which abuts against the end of the pipe section, said sleeve being embedded in the cement lining, substantially as described.

2. A metal pipe section and fitting connected together having a continuous cement lining extending throughout the length of the pipe section and into the fitting, and a metal sleeve arranged in said fitting having an outwardly extended apertured flange at one end which abuts against the end of the pipe section, said sleeve being embedded in the cement lining, substantially as described.

3. A metal pipe section and fitting connected together having a continuous cement lining extending throughout the length of the pipe section and into the fitting, and a metal sleeve arranged in said fitting having an outwardly extended flange at one end with an apertured edge, which abuts against the end of the pipe section, said sleeve being embedded in the cement lining, substantially as described.

4. A metal pipe section and fitting connected together having a continuous cement lining extending throughout the length of the pipe section and into the fitting, and a metal sleeve arranged in said fitting having an outwardly extended flange at one end which abuts against the end of the pipe section, said sleeve being embedded in the cement lining and extended beyond the end of said lining to form an annular recess between it and the fitting, to receive the end of another cement-lined pipe section, substantially as described.

5. A metal pipe section and fitting connected together having a continuous cement lining extending throughout the length of the pipe section and into the fitting, and a metal sleeve arranged in said fitting having an outwardly extended flange at one end which abuts against the end of the pipe section, said sleeve being embedded in the cement lining and extended beyond the end of said lining to form an annular recess between it and the fitting to receive a packing and the end of another cement-lined pipe section, substantially as described.

6. A metal pipe section and fitting connected together having a continuous cement lining extending throughout the length of the pipe section and into the fitting, and a metal sleeve arranged in said fitting having an outwardly extended flange at one end which abuts against the end of the pipe section, said sleeve being embedded in the cement lining, and extended beyond the end of said lining to form an annular recess between it and the fitting, and another pipe section having a cement lining, the said lining at the end of the second pipe section being formed with an annular recess thereby adapting said second pipe section to be connected with the aforesaid fitting and to enter the recess between said fitting and sleeve, substantially as described.

In testimony whereof, I have signed my name to this specification, in the presence of two subscribing witnesses.

GEORGE W. PRIEST.

Witnesses:
B. J. NOYES,
H. B. DAVIS.